United States Patent Office 3,582,371
Patented June 1, 1971

3,582,371
BETA-SPODUMENE-ANATASE GLASS-CERAMIC ARTICLE
Adrian A. Bruno, Painted Post, Hermann L. Rittler, Horseheads, and Maurice I. Rosenfield, Elmira, N.Y., assignors to Corning Glass Works, Corning, N.Y.
No Drawing. Filed Jan. 13, 1969, Ser. No. 790,827
Int. Cl. C04b 33/00
U.S. Cl. 106—39     1 Claim

ABSTRACT OF THE DISCLOSURE

This invention relates to glass-ceramic articles in the $Li_2O$-$MgO$-$Al_2O_3$-$SiO_2$ composition system nucleated with $TiO_2$ which are highly resistant to food staining because any $TiO_2$ crystallization present consists essentially entirely of anatase rather than rutile.

---

A glass-ceramic article is manufactured through the controlled crystallization in situ of a glass article. In general, the production of a glass ceramic article involves three primary steps: first, a glass-forming batch normally containing a nucleating agent is melted; second, the melt is simultaneously cooled and shaped to an article of glass of a desired configuration, and third, the glass article is exposed to a particularly-defined heat treatment which causes nuclei to be initially developed in the glass that act as sites for the growth of crystals thereon as the heat treatment progresses.

This crystallization in situ, then, is the result of essentially simultaneous growth on countless nuclei within the glass article and, because of this, the structure of a glass-ceramic article is comprised of relatively uniformly-sized, fine-grained crystals homogeneously dispersed in a residual glassy matrix, the crystals constituting the predominant proportion of the article. Hence, glass-ceramic articles are usually defined as having a crystal content greater than 50% by weight and, frequently, will be greater than 75% by weight crystalline. Such a high crystal content produces an article exhibiting chemical and physical properties that are normally quite different from those of the parent glass article but which, rather, are very similar in character to those of a crystalline ceramic. Finally, the great crystallinity of the glass-ceramic article results in the article having a residual glassy matrix which is very small in amount and much different in composition from that of the parent glass since the crystal components will have been precipitated therefrom.

The theoretical concepts and the practical considerations involved in the manufacture of glass-ceramic articles, as well as a discussion of the mechanism underlying the crystallization in situ reaction, are set forth in U.S. Pat. No. 2,920,971 and reference is made to that patent for further details relating to the general art of glass-ceramic production.

Glass-ceramic materials have enjoyed extensive service as culinary ware. Several factors have combined to make glass-ceramic materials eminently suitable for this service: (1) the porosity thereof is vertually nil; (2) the strength thereof is frequently at least twice that of glass and that of conventional china and porcelain; (3) the use temperatures thereof are generally higher than those for glass; (4) the coefficient of thermal expansion can be made lower than that for glasses and conventional crystalline ceramics; and (5) the visual appearance and tactile quality can be made to simulate fine china and porcelain. Therefore, in view of these factors, all types of culinary ware, e.g., skillets, baking dishes, casseroles, etc., have been manufactured commercially and, most recently, flat sheets thereof have been utilized as cooking surfaces. In the latter application, the glass-ceramic sheet, after being ground and polished to produce an attractive flat surface, is mounted directly over a heat source and cooking is done thereon. These sheets can readily be decorated through external staining, enamelling, and glazing or by including pigments in the original glass batch, thereby making possible a very pleasing and colorful cooking surface.

However, one problem which has assumed great magnitude in the case of the flat cooking surfaces is the tendency of the glass-ceramic sheet to become stained when food is burned onto the surface. This tendency to stain had been long recognized but the problem with glass-ceramic culinary utensils was not very severe since these are commonly cleaned after each use. But, laboratory testing has demonstrated that when food burned onto the surface of the sheet is not removed and the surface is heated and cooled through several cycles, a stain may be developed within the surface which cannot be removed utilizing normal cleaning practices.

Since a glass-ceramic article is essentially non-porous, this staining cannot be merely the result of mechanical diffusion but the actual mechanism therefor is not fully understood as of the persent time. However, it has been theorized that, as the food is burned onto the sheet, it pyrolyzes and bonds to the surface of the glass-ceramic. Pyrolytic fragments of unsaturated olefins are produced together with hydrogen. These migrate into any microcracks that may have been placed in the glass-ceramic during a decoration-firing operation, through abrasion of the surface, or some other means. The hydrogen generated as the organic materials pyrolyze acts to reduce any readily reducible oxide in the composition.

By far the most used nucleating agent in the production of glass-ceramic articles has been and is $TiO_2$. Thus, essentially every glass-ceramic article being offered for sale at the present time employs $TiO_2$ alone as the nucleating agent or in conjunction with another recognized nucleating agent such as $ZrO_2$, $SnO_2$, or $Cr_2O_3$. $TiO_2$ enjoys virtual universality in its ability to nucleate glass compositions. Further, because of its property as a flux, the very high melting temperatures required with the presence of $ZrO_2$, $SnO_2$, and $Cr_2O_3$ alone are avoided, a very important factor to be considered commercially. Thus, the glass-ceramic culinary utensils and cooking surfaces referred to above employ $TiO_2$ in fairly substantial amounts as the nucleating agent. Yet, $TiO_2$ is known to be quite susceptible to reducing conditions and it is believed that the undesirable staining is the result of this reduction of $TiO_2$. Therefore, it would appear apparent that the elimination of all readily reducible oxides, including the $TiO_2$, from the glass-ceramic composition would remove the staining. However, as was observed above, $TiO_2$ is the most effective nucleating agent known and has the added advantage of aiding in melting the original glass batch, rather than being a highly refractory material, so its elimination poses substantial manufacturing problems.

The primary object of this invention is, therefore, to provide a method for rendering $TiO_2$-nucleated glass-ceramic articles highly resistant to food staining caused by the reducing environment resulting from the pyrolysis of organic materials.

The glass-ceramic culinary utensils and cooking surfaces presently available in the marketplace are, in the main, manufactured by Corning Glass Works as Code 9608 under the trademark Corning Ware. This product has a composition of approximately 70% $SiO_2$, 17.6% $Al_2O_3$, 2.7% $Li_2O$, 2.6% $MgO$, 1.3% $ZnO$, 1% $As_2O_5$, and 4.8% $TiO_2$. As can be seen, the material contains about 5% $TiO_2$. X-ray diffraction analyses have demonstrated that beta-spodumene solid solution (beta-spodumene s.s.) comprises the principal crystal phase with minor amounts of spinel ($MgO \cdot Al_2O_3$) and rutile ($TiO_2$)

being present. As sold commercially, the glass-ceramic articles are greater than 90% by weight crystalline with the combined amounts of spinel and rutile comprising about 10% of the crystallization.

We have discovered that $TiO_2$-nucleated glass-ceramic articles which are very highly resistant to food staining can be obtained where any $TiO_2$ crystals present exist in the articles in the anatase rather than the rutile form. This discovery, confirmed by X-ray diffraction analyses of the glass-ceramic article, has permitted the use of melting, forming, and heat treating practices essentially identical to those presently utilized in the commercial manufacture of Corning Ware articles. The mechanism through which the anatase resists the reduction of titanium and, thereby, avoids the deleterious staining is not fully understood but the effect is very real.

We have learned that $TiO_2$-nucleated glass-ceramic articles containing beta-spodumene solid solution( beta-spodumene s.s.) as the principal crystal phase with the development of an anatase rather than a rutile phase can be secured by restricting the MgO content thereof to less than about 2.5% by weight while maintaining a molar ratio of $Al_2O_3$ to the total of the modifying oxides greater than 1. Such articles consist essentially, by weight on the oxide basis, of about 0.5–2.5% MgO, 1.5–4% $Li_2O$, 19.5–23.5% $Al_2O_3$ 65–72% $SiO_2$, and 3.5–5.5% $TiO_2$ as the nucleating agent, the total of these components constituting at least 96% of the composition. Of other various modifying oxides, ZnO may be present in amounts of up to 2.5%; BaO, $Na_2O$, and $K_2O$ may be present in amounts totalling about 1%; and CaO and $ZrO_2$ may be present in amounts less than about 0.25% each. Where $As_2O_5$ is employed as a fining agent, it may be present in amounts up to 1.5%.

Therefore, our invention comprises melting a batch for a glass consisting essentially, by weight on the oxides basis, of 0.5–2.5% MgO, 1.5–4% $Li_2O$, 19.5–23.5% $Al_2O_3$, 65–72% $SiO_2$, and 3.5–5.5% $TiO_2$, the molar ratio of $Al_2O_3$ to the modifying oxides being greater than 1 and the sum of MgO, $Al_2O_3$, $Li_2O$, $SiO_2$, and $TiO_2$ being greater than 96% of the total composition, simultaneously cooling the melt at least below the transformation range thereof and shaping a glass article therefrom, and thereafter heating said glass article to a temperature between about 900°–1200° C. for a period of time sufficient to attain the desired high crystallization in situ. The transformation range is that temperature at which a liquid melt is deemed to have been transformed into an amorphous solid; this temperature usually being formed into an amorphous solid; this temperature usually being defined as lying between the strain point and the annealing point of a glass.

Examination of the articles through a combination of X-ray diffraction analysis and electron microscopy has demonstrated them to be greater than 80% by weight crystalline with beta-spodumene solid solution constituting by far the major crystal phase with less than 5% each of spinel and anatase. The crystals, themselves, are relatively fine-grained, essentially all being finer than 10 microns and the great majority being smaller than 1 micron in diameter. Virtually no rutile is observed.

Inasmuch as the rate of crystallization is dependent upon temperature, it will readily be appreciated that where temperatures within the upper extreme of the crystallization range are employed, a brief heating period only will be required, e.g., 0.25 hour or even less. However, where temperatures within the cooling extreme of the crystallization range are used, much longer heating periods will be necessary to secure the desired high crystallinity, e.g., 12–24 hours.

Our preferred heat treating procedure contemplates a two-step schedule. The glass article is first heated to a temperature somewhat above the transformation range, i.e., to temperature between about 750°–900° C., and held within this temperature range for a period of time sufficient to develop good nucleation and initiate crystal growth. The nucleated article is thereafter heated to between about 1000°–1200° C. and maintained at those temperatures for a sufficient length of time to secure a highly crystalline product. In pursuing this preferred procedure, we commonly utilize a nucleation time of about 1–6 hours and a crystallization hold of about 1–8 hours.

It will be understood that various modifications in the above-described manufacturing process are possible. For example, when the melted batch is quenched to a temperature below the transformation range of the melt and shaped into a glass article, this glass article may be cooled all the way to room temperature to allow the visual inspection of glass quality prior to crystallizing the glass article. Nevertheless, where production speed and fuel economies are sought, the molten batch may merely be cooled to a glass shape at some temperature just below the transformation range and the heat treatment commenced immediately thereafter. Further, whereas preferred practice comprises a two-step heat treating schedule, a very satisfactory crystallized article can be obtained when the glass article is simply heated from room temperature or from just below the transformation range to temperatures within 900°–1200° C. and maintained within that range for a period of time sufficient to produce the desired highly crystalline article.

In still another embodiment of the heat treating process, no dwell period, as such, at any one temperature is utilized. Hence, for example, if the rate of heating above the transformation range is slow, no dwell period at any one temperature will be necessary but, rather, the heat treatment will be concluded when the article is assumed to be highly crystalline, as determined empirically. However, since the rate crystal growth is a function of temperature, the rate at which the glass article is heated above the transformation range must not be so rapid that there is insufficient time for a growth of crystals to occur adequate to support the article. Lack of such support will result in deformation and slumping of the article. Therefore, although heating rates of 10° C./minute and higher have been successfully employed, especially in those instances where some physical support has been provided for the glass article to restrict deformation thereof, we prefer to utilize heating rates not exceeding about 5° C./minute. Such heating rates have resulted in articles exhibiting very little, if any, deformation in the field of compositions encompassed within this invention. Of course, where dwell periods of substantial duration have been employed at the lower extreme of the crystallization range to grow a significant number of crystals, the temperature of the article may be heated rapidly to higher temperatures in the crystallization range.

Table I records compositions, expressed in weight percent on the oxide basis, of thermally crystallizable glasses which, upon exposure to the heat treatment procedure of this invention, were crystallized in situ to relatively uniformly fine-grained glass-ceramic articles exhibiting exceptional resistance to stains such as are caused by food being burned thereon. The ingredients making up the glass-forming batches may be any materials, either the oxides or other compounds, which, on being melted together, are converted to the desired oxide compositions in the proper proportions. The batch materials were compounded, ballmilled together to secure a more homogeneous melt, and then melted in open platinum crucibles for about 16 hours at temperatures between about 1550°–1600° C. Glass cane samples of about 0.25" diameter were drawn from each melt and the remainder poured onto a steel plate to produce a circular patty of glass about 0.5" thick. The glass patties were immediately transferred to an annealer operating at about 650° C. After annealing, the glass articles were examined visually for glass quality and then transferred to an electrically-fired kiln where they were exposed to the heat treatment schedules reported in Table II. Following the stated heat treatment, the electric current to the kiln was cut off and the crystallized articles were either taken directly from the kiln into the ambient atmosphere or simply left inside the kiln and allowed to cool to room temperature at kiln rate. The rate at which the kiln cooled to room temperature was estimated to average about 3°–5° C./minute.

TABLE I

|  | 1 | 2 | 3 | 4 | 5 | 6 |
|---|---|---|---|---|---|---|
| $SiO_2$ | 67.5 | 67.95 | 69.0 | 67.0 | 66.5 | 63.0 |
| $Al_2O_3$ | 20.5 | 20.5 | 19.0 | 21.0 | 21.0 | 24.0 |
| $Li_2O$ | 3.6 | 3.6 | 3.6 | 3.6 | 3.6 | 4.0 |
| $MgO$ | 1.7 | 1.7 | 1.7 | 1.7 | 1.7 | 2.0 |
| $ZnO$ | 1.2 | 1.2 | 1.2 | 1.2 | 1.2 | 1.0 |
| $TiO_2$ | 4.8 | 4.8 | 4.8 | 4.8 | 5.3 | 5.0 |
| $As_2O_5$ | 0.7 | 0.25 | 0.7 | 0.7 | 0.7 | 1.0 |

Table II records the heat treatment schedule to which each glass article was exposed along with a visual description of each crystallized article, a measurement of the coefficient of thermal expansion (25°–800° C.) determined in the conventional manner, a measurement of the modulus of rupture also undertaken in the conventional manner, and the crystal phases preset as identified through X-ray diffraction analysis. In each schedule, the temperature was raised from room temperature at the rate recited in Table II to the individual dwell periods and the samples then withdrawn into the ambient atmosphere.

(1) L—indicating whiteness of the sample relative to a standard block of $MgCO_3$ with a value of 100;

(2) a—indicating a green-red comparison between the samples and a standard;

(3) b—indicating a blue-yellow comparison between the sample and a standard.

The a and b readings permit the quantitative determination of the color of a stain.

(B) After the set of background values has been observed, the samples are stained either directly upon or adjacent to the area where the background has been read.

(C) The samples are then washed in the area of the stain and the three values again read on the instrument for the stained area.

(D) The difference between the L readings ($\Delta L$) before and after staining is deemed to represent the intensity of the stain and this $\Delta L$ value constitutes the foundation of Table III.

The actual procedure followed in evaluating the staining characteristics of Corning Ware and the glass-ceramic compositions of the instant invention comprised eight steps:

(1) An extract of freeze-dried spinach was dissolved

TABLE II

| Example No. | Heat treatment | Visual appearance | Crystal phases | Modulus of rupture, p.s.i. | Exp. coeff. ($\times 10^{-7}$/°C.) |
|---|---|---|---|---|---|
| 1 | Heat at 300° C./hour to 750° C.; heat at 100° C./hour to 850° C.; heat at 300° C./hour to 1,100° C.; hold at 1,100° C. for 2 hours. | White, opaque | Beta-spodumene s.s., spinel, anatase. | 12,000 | 11.6 |
| 2 | Heat at 300° C./hour to 800° C.; hold at 800 C. for 4 hours; heat at 300° C./hour to 1,000° C.; hold at 1,000° C. for 2 hours; heat at 300° C./hour to 1,100° C. | do | do | 12,000 | 11.6 |
| 3 | Heat at 300° C./hour to 750 C.; heat at 100° C./hour to 850° C.; heat at 300° C./hour to 1,100° C.; hold at 1,100° C. for 2 hours. | do | do | 13,500 | 16.7 |
| 4 | do | do | do | 13,000 | 17.4 |
| 5 | Heat at 300° C./hour to 780° C.; hold at 780° C. for 4 hours; heat at 300° C./hour to 1,100° C.; hold at 1,100° C. for 2 hours; heat at 300° C./hour to 1,200° C. | Oyster white, opaque | Beta-spodumene s.s., anatase. | 13,000 | 12.8 |
| 6 | do | White, opaque | Beta-spodumene s.s., spinel, anatase. | 12,000 | 12 |

Finally, Table III illustrates the resistance to staining exhibited by each of the examples in comparison with that demonstrated by the above-described commercially-available Corning Ware product.

In order to measure the susceptibility of glass-ceramic articles to food staining, a substantially quantitative test was necessary. Reports from field testing and laboratory examinations had demonstrated that considerable staining resulted when spinach was burned onto the glass-ceramic surface. On frequent occasions, a perceptible stain was apparent after the first burning on of the spinach and the stain became progressively worse as the burned spinach was heated and cooled through additional cycles. Therefore, rather than experimenting with a mixture of foods, a quantitative test was devised to study the variations in the susceptibility to staining of glass-ceramic materials employing spinach as the staining agent. This test has been deemed to have a reproducibility of about 10%.

In carrying out this test, a Hunter D–25 Color-Color Difference Meter manufactured by Hunter Associates, Inc. was employed to distinguish the rather subtle differences which may be present in stain characteristics. This instrument "reads" the difference in color quality between the unstained portion of a sample plate, its background, and an adjacent stained area. Thus, a sample set of readings would comprise:

(A) The background readings are taken on the sample prior to stain testing. Three values can be read on the apparatus:

in distilled water to yield a 1% by weight solution;

(2) Samples of plate of 4" x 2" x ¼" were ground and polished and then carefully washed with a commercial cleansing powder;

(3) A crayon circle of 1⅝" diameter was placed on the plate samples utilizing a Blaisdell china marker;

(4) A set of background values was taken of the encircled area with the Hunter D–25 meter;

(5) A 0.6 ml. of the staining solution was placed in the circle and spread until the encircled area was covered;

(6) The coated samples were placed in an electric furnace, heated at 5° C./minute to 400° C., held thereat for 20 minutes, and then withdrawn into the ambient atmosphere;

(7) The stained samples were cooled and carefully washed utilizing the commercial cleansing powder cited above; and then (8) A set of values was taken of the encircled area with the Hunter D–25 meter and $\Delta L$ calculated therefrom.

Table III records the $\Delta L$ obtained from these tests on the various glass-ceramic articles. One cycle represents a sequence of all eight steps. However, to demonstrate an article's resistance to staining resulting from the repeated heating and cooling of the stained surface, step 6 was conducted several times before the stained samples were washed and then tested with the Hunter D–25 meter. Hence, the $\Delta L$ values reported after 5 and 10 repeated heatings and coolings of the stained samples.

TABLE III

| Example No.: | Cycles | | |
|---|---|---|---|
| | 1 | 5 | 10 |
| 1 | 0.1 | 0.5 | 0.7 |
| 2 | 0.1 | 0.3 | 0.4 |
| 3 | 0.1 | 0.5 | 0.8 |
| 4 | 0.1 | 0.5 | 0.7 |
| 5 | 0.1 | 0.5 | 0.8 |
| 6 | 0.1 | 0.5 | 0.9 |
| Corning Ware | 0.5 | 1.5 | 2.0 |

It is believed that the combination of Tables I, II, and III clearly illustrates the critical composition parameters required for manufacturing $TiO_2$-nucleated glass-ceramic articles demonstrating excellent resistance to staining developed from food being burned thereon. Hence, when the composition lies outside the defined limits and any $TiO_2$ crystallization present exists in the form of rutile rather than anatase, the stain resistance deteriorates markedly, as is evidenced in Table III where the glass-ceramic articles of this invention are compared with commercial Corning Ware. Thus, our invention is founded upon the discovery that rutile in any substantial amount must be absent from glass-ceramic articles to impart resistance to food staining thereto. Where $TiO_2$ crystals are present, they must be available as anatase.

While the mechanism through which anatase rather than rutile crystals are developed in these glass-ceramic articles is not fully understood, where the molar ratio of $Al_2O_3$ to the modifying oxides present in the glass is greater than 1, X-ray diffraction analysis shows virtually no rutile.

Example 2 is our preferred composition which, when exposed to the heat treatment schedule recited in Table II, yields a glass-ceramic article that is eminently suitable for culinary ware and cooking surfaces inasmuch as it is aesthetically very attractive, has a low coefficient of thermal expansion imparting good thermal shock resistance thereto, is mechanically strong, and demonstrates excellent resistance to staining caused by the burning of food.

We claim:

1. An essentially rutile-free, glass-ceramic article exhibiting very superior resistance to staining resulting from food being burned thereon consisting essentially of beta-spodumene solid solution and anatase crystals dispersed in a glassy matrix, said crystals comprising at least 80% by weight of the article, including less than about 5% anatase and 0-5% spinel, and being formed through the crystallization in situ of a glass article consisting essentially, by weight on the oxide basis, of about 0.5-2.5% MgO, 1.5-4% $Li_2O$, 19.5-23.5% $Al_2O_3$, 65-72% $SiO_2$, and 3.5-5.5% $TiO_2$, the molar ratio of $Al_2O_3$ to modifying oxides being greater than 1 and the sum of MgO, $Li_2O$, $Al_2O_3$, $SiO_2$, and $TiO_2$ constituting at least 96% by weight of the total composition.

References Cited

UNITED STATES PATENTS

| | | | |
|---|---|---|---|
| 3,013,362 | 12/1961 | Calkins et al. | 106—39X |
| 3,406,279 | 10/1968 | Ziver | 219—464 |
| 3,409,458 | 11/1968 | Spencer-Strong et al. | 106—48X |
| 3,488,149 | 1/1970 | Skrivan | 106—300 |

HELEN M. McCARTHY, Primary Examiner

W. R. SATTERFIELD, Assistant Examiner

U.S. Cl. X.R.

65—33